(12) United States Patent
Lin et al.

(10) Patent No.: US 12,065,045 B2
(45) Date of Patent: Aug. 20, 2024

(54) VEHICLE-MOUNTED POWER SUPPLY SYSTEM

(71) Applicant: Huawei Digital Power Technologies Co., Ltd., Shenzhen (CN)

(72) Inventors: Quanxi Lin, Dongguan (CN); Tong Wang, Dongguan (CN); Hong Tuo, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 137 days.

(21) Appl. No.: 17/872,147

(22) Filed: Jul. 25, 2022

(65) Prior Publication Data
US 2023/0026820 A1     Jan. 26, 2023

(30) Foreign Application Priority Data

Jul. 26, 2021 (CN) .......................... 202121713258.8

(51) Int. Cl.
*B60L 50/52*     (2019.01)
*B60L 50/60*     (2019.01)
*H02M 3/158*     (2006.01)

(52) U.S. Cl.
CPC ............ *B60L 50/52* (2019.02); *B60L 50/60* (2019.02); *H02M 3/158* (2013.01); *B60L 2210/10* (2013.01); *B60L 2240/527* (2013.01)

(58) Field of Classification Search
CPC ...... B60L 50/52; B60L 50/60; B60L 2210/10; B60L 2240/527; B60L 15/20; B60L 2200/12; H02M 3/158; H02M 1/0032; H02M 3/156; H02M 3/1582; Y02T 10/64; Y02T 10/70

USPC .......................... 318/108, 107, 106, 105, 34
See application file for complete search history.

(56) References Cited

U.S. PATENT DOCUMENTS

| | | | | |
|---|---|---|---|---|
| 7,083,017 B2 * | 8/2006 | Hasuka | ............... | H01M 8/0488 429/432 |
| 7,661,494 B2 * | 2/2010 | Saeki | ............... | H01M 8/04559 180/65.1 |
| 10,581,362 B2 * | 3/2020 | Oguma | ................ | B60L 58/20 |

FOREIGN PATENT DOCUMENTS

| | | |
|---|---|---|
| CN | 109910635 A | 6/2019 |
| CN | 110011374 A | 7/2019 |
| CN | 110061663 A | 7/2019 |

* cited by examiner

*Primary Examiner* — David Luo
(74) *Attorney, Agent, or Firm* — Maier & Maier, PLLC

(57) ABSTRACT

A vehicle-mounted power supply system includes a sampling circuit, a voltage comparison control circuit, a power conversion circuit, and a motor. The sampling circuit is configured to obtain an output voltage value of an output terminal of the power conversion circuit. The voltage comparison control circuit is configured to output a first power adjustment signal to the power conversion circuit when the output voltage value is less than a first target voltage value. The power conversion circuit is configured to increase an output voltage to a first target voltage based on the first power adjustment signal, to output the output voltage to the motor and increase an input voltage of the motor. When a voltage of a power supply is low, the input voltage of the motor can be maintained at a required level.

12 Claims, 6 Drawing Sheets

VEHICLE-MOUNTED POWER SUPPLY SYSTEM

CROSS-REFERENCE TO RELATED APPLICATION

This application claims priority to Chinese Patent Application No. 202121713258.8, filed on Jul. 26, 2021, which is hereby incorporated by reference in its entirety.

TECHNICAL FIELD

The embodiments relate to the field of power electronics technologies, and a vehicle-mounted power supply system.

BACKGROUND

In the field of vehicle-mounted power supply technologies, for example, in an electric two-wheeler or an electric three-wheeler, a brushless direct current motor is mostly used for driving. The motor is connected to a battery (namely, a power supply) of an electric vehicle, and the motor obtains a required electromagnetic torque (corresponding to an acceleration of the vehicle) and a required rotational speed of a rotor (corresponding to a speed of the vehicle) by controlling a value of a terminal voltage of a winding of the motor. The acceleration and speed of the electric vehicle are limited by an input voltage of the motor, and the input voltage of the motor is limited by a terminal voltage of the battery (namely, an output terminal voltage of the power supply). During battery discharge, the terminal voltage of the battery gradually decreases. When the voltage decreases, the input voltage of the motor is affected, and the acceleration and speed of the vehicle are affected. For a vehicle-mounted power supply system, a conventional technology generally performs precise control (for example, field-oriented control (FOC)) on a current, adjusts an output current of the motor to adjust driving parameters of the vehicle (namely, the acceleration and speed of the vehicle), or increases a charging speed of the battery to increase a battery level before driving, to ensure dynamic performance However, none of these methods can directly resolve the problem that the input voltage of the motor is insufficient because the voltage of the battery decreases in a driving process, and the driving speed and acceleration of the vehicle cannot be maintained in the driving process.

SUMMARY

The embodiments may provide a vehicle-mounted power supply system. When a voltage of a power supply is low, an input voltage of a motor can be maintained at a required level. This ensures that a vehicle obtains a required acceleration and speed and improves user experience. A circuit is simple, and applicability of the system is improved.

According to a first aspect, the embodiments may provide a vehicle-mounted power supply system. The vehicle-mounted power supply system includes a sampling circuit, a voltage comparison control circuit, a power conversion circuit, and a motor. The sampling circuit is connected to an output terminal of the power conversion circuit and the voltage comparison control circuit. The voltage comparison control circuit is connected to the power conversion circuit. The power conversion circuit is connected to a power supply and the motor.

The sampling circuit may be configured to obtain an output voltage value of the output terminal of the power conversion circuit. Herein, an output voltage of the power conversion circuit acts on the motor (herein, the motor may include a motor controller and components such as a stator, a rotor, and a three-phase winding in the motor), so that the motor generates an electromagnetic torque positively correlated with the output voltage of the power conversion circuit (namely, the input voltage of the motor). In this way, a vehicle generates an acceleration that is positively correlated with the electromagnetic torque, to increase a driving speed of the vehicle. The voltage comparison control circuit may be configured to output a first power adjustment signal to the power conversion circuit when the output voltage value is less than a first target voltage value. Herein, the power conversion circuit may increase the output voltage to a first target voltage based on the first power adjustment signal, and output the output voltage to the motor, to increase the input voltage of the motor. In other words, when the output voltage value of the power conversion circuit (namely, the input voltage of the motor) is less than the first target voltage (namely, a rated input voltage of the motor), the motor cannot obtain a sufficient electromagnetic torque or a sufficient rotational speed of a rotor. It may be understood that the vehicle-mounted power supply system may increase the output voltage of the power conversion circuit to the first target voltage, to maintain the input voltage of the motor at a required level when the voltage of the power supply is low. This ensures that the vehicle obtains the required acceleration and speed.

In an implementation, the sampling circuit may obtain the output voltage value of the output terminal of the power conversion circuit. The voltage comparison control circuit may output the first power adjustment signal to the power conversion circuit based on the output voltage value and the first target voltage value. The power conversion circuit may increase the output voltage to the first target voltage based on the first power adjustment signal, and output the output voltage to the motor, to increase the input voltage of the motor. When the voltage of the power supply in the vehicle is low, the vehicle-mounted power supply system may increase the output voltage, so that the vehicle can still maintain a high driving speed and acceleration. This improves user experience. In addition, the sampling circuit obtains the output voltage value in real time. This improves flexibility of the system. The voltage comparison control circuit and the power conversion circuit control the output voltage. A circuit is simple, and applicability of the system is improved.

With reference to the first aspect, in a first possible implementation, the voltage comparison control circuit may include a proportional-integral circuit and a control circuit. The proportional-integral circuit (or a proportion integrator) is connected to the sampling circuit and the control circuit. The control circuit is connected to the power conversion circuit. The proportional-integral circuit may obtain a first modulation duty cycle based on the output voltage value and the first target voltage value. The control circuit is configured to output the first power adjustment signal based on the first modulation duty cycle when the output voltage value is less than the first target voltage value. It may be understood that the proportional-integral circuit may obtain, by comparing the output voltage value with the first target voltage value, the first modulation duty cycle required for modulating the output voltage value to the first target voltage value. Herein, the first modulation duty cycle may be obtained through calculation based on a difference between the output voltage value and the first target voltage value or may be obtained through calculation based on a ratio of the output voltage value to the first target voltage value or may be obtained through calculation by using another circuit having a function similar to that of the proportional-integral circuit. The control circuit may output the first power adjustment signal (for example, a modulation signal whose duty cycle is the first modulation duty cycle) based on the first modulation duty cycle. Herein, the proportional-integral circuit and the control circuit may alternatively be integrated into a proportional-integral controller (for example, a PI controller or another controller). The proportional-integral controller (for example, the PI controller) may form a control deviation based on a given value (namely, the first target voltage value) and an actual output value (namely, the output voltage value), form a control value by performing linear combination on a proportion and an integral of the deviation, and control a controlled object (namely, the modulation duty cycle of the power adjustment signal), to obtain the first power adjustment signal. It may be understood that the vehicle-mounted power supply system calculates the first modulation duty cycle by using the proportional-integral circuit, and outputs the first power adjustment signal based on the first modulation duty cycle by using the control circuit, so that components in the system can be simplified.

With reference to a second possible implementation, the sampling circuit may be further configured to connect to the power supply and obtain an output current value of the power supply. Herein, the output current value of the power supply is positively correlated with a torque of the motor, and a maximum value of the output current value is positively correlated with the output voltage value of the power conversion circuit (in other words, the output current value is limited by the output voltage value of the power conversion circuit). When the torque of the motor (corresponding to the acceleration of the vehicle) increases, the output current value accordingly increases. To ensure safety of the system, the output current value of the power supply is usually limited not to exceed a target current value. Herein, the target current value may be a value set by the system in an initial state or may be correspondingly obtained in real time based on parameters (for example, a cell temperature of the power supply) of some components in the system. Herein, the voltage comparison control circuit may output a second power adjustment signal to the power conversion circuit when the output current value of the power supply is greater than the target current value, so that the power conversion circuit can decrease the output voltage to a second target voltage based on the second power adjustment signal, and the output current value of the power supply is less than or equal to the target current value.

In an implementation, the sampling circuit may obtain the output current value of the power supply. The voltage comparison control circuit may output the second power adjustment signal to the power conversion circuit when the output current value of the power supply is greater than the target current value. The power conversion circuit may decrease the output voltage to the second target voltage based on the second power adjustment signal, to reduce the output current value of the power supply, so that the output current value of the power supply is less than or equal to the target current value. The vehicle-mounted power supply system can decrease the output voltage to ensure that an output current of the power supply is still kept in a safe range in a driving process of the vehicle. This improves safety of the system. In addition, the sampling circuit obtains the output current value of the power supply in real time. This improves flexibility of the system. The voltage comparison control circuit and the power conversion circuit control the output voltage. A circuit is simple, and applicability of the system is improved.

With reference to a third possible implementation, when the output current value of the power supply is greater than the target current value, the proportional-integral circuit (or a proportional integrator) may obtain a second modulation duty cycle based on the output current value of the power supply and a second target voltage value. The control circuit may further output a second power adjustment signal based on the second modulation duty cycle, to decrease the output voltage of the power conversion circuit to the second target voltage. It may be understood that the proportional-integral circuit may obtain, by comparing the output current value of the power supply with the target current value, the second modulation duty cycle required for modulating the output voltage value to the second target voltage value (namely, the second modulation duty cycle for modulating the output current value of the power supply to the target current value). Herein, the second modulation duty cycle may be obtained through calculation based on a difference between the output current value of the power supply and the target current value, or may be obtained through calculation based on a ratio of the output current value of the power supply to the target current value, or may be obtained through calculation by using another circuit having a function similar to that of the proportional-integral circuit. The control circuit may output the second power adjustment signal (for example, a modulation signal whose duty cycle is the second modulation duty cycle) based on the second modulation duty cycle. Herein, the proportional-integral circuit and the control circuit may alternatively be integrated into a proportional-integral controller (for example, a PI controller or another controller). The proportional-integral controller (for example, the PI controller) may form a control deviation based on a given value (namely, the target current value) and an actual output value (namely, the output current value of the power supply), form a control value by performing linear combination on a proportion and an integral of the deviation, and control a controlled object (namely, the modulation duty cycle of the power adjustment signal), to obtain the second power adjustment signal. It may be understood that the proportional-integral circuit calculates the second modulation duty cycle, and the control circuit outputs the second power adjustment signal based on the second modulation duty cycle, so that components in the system can be simplified, and applicability of the system can be improved.

With reference to a fourth possible implementation, the sampling circuit may be further configured to connect to the power supply and obtain the output current value of the power supply. The voltage comparison control circuit may be further configured to output a third power adjustment signal when the output voltage value is less than the first target voltage value and the output current value of the power supply is less than the target current value. In this case, because the output current value of the power supply is less than the target current value, it means that when safety is satisfied, the system may increase the output voltage of the power conversion circuit to a third target voltage, to increase the input voltage of the motor. Herein, the third target voltage is less than or equal to the first target voltage. It may be understood that the power conversion circuit may further increase the output voltage to the third target voltage based on the third power adjustment signal, to increase the input voltage of the motor when safety is satisfied, so as to meet a driving requirement of the vehicle and improve dynamic performance of the vehicle.

In an implementation, the sampling circuit may obtain the output current value of the power supply. The voltage comparison control circuit may output the third power adjustment signal to the power conversion circuit when the output voltage is less than the first target voltage and the output current value of the power supply is less than the target current value. The power conversion circuit may increase the output voltage to the third target voltage based on the third power adjustment signal. In other words, when system safety is ensured, the system can increase the output voltage of the power conversion circuit, to meet a driving requirement of the vehicle and improve dynamic performance of the vehicle. In addition, the sampling circuit obtains the output current value of the power supply and the output voltage value of the power conversion circuit in real time. This improves flexibility and safety of the system. The voltage comparison control circuit and the power conversion circuit control the output voltage. A circuit is simple, and applicability of the system is improved.

With reference to a fifth possible implementation, the voltage comparison control circuit may include a proportional-integral circuit, a control circuit, and a comparison circuit. The proportional-integral circuit is connected to the sampling circuit and the comparison circuit. The comparison circuit is connected to the control circuit. The control circuit is connected to the motor. The proportional-integral circuit (or the proportional integrator) may obtain a first modulation duty cycle based on the output voltage value and the first target voltage value and obtain a second modulation duty cycle based on the output current value of the power supply and the target current value. It may be understood that the first modulation duty cycle required for modulating the output voltage value to the first target voltage value may be obtained by comparing the output voltage value with the first target voltage value, or the second modulation duty cycle required for modulating the output voltage value to a second target voltage value (namely, the second modulation duty cycle for modulating the output current value of the power supply to the target current value) may be obtained by comparing the output current value of the power supply with the target current value. Herein, the first modulation duty cycle may be obtained through calculation based on a difference between the output voltage value and the first target voltage value or may be obtained through calculation based on a ratio of the output voltage value to the first target voltage value or may be obtained through calculation by using another circuit having a function similar to that of the proportional-integral circuit. Herein, the second modulation duty cycle may be obtained through calculation based on a difference between the output current value of the power supply and the target current value, or may be obtained through calculation based on a ratio of the output current value of the power supply to the target current value, or may be obtained through calculation by using another circuit having a function similar to that of the proportional-integral circuit. The comparison circuit may obtain a target modulation duty cycle based on the first modulation duty cycle and the second modulation duty cycle that are output by the proportional-integral circuit. Herein, the target modulation duty cycle is a smaller value of the first modulation duty cycle and the second modulation duty cycle. In other words, the comparison circuit may use the smaller value of the first modulation duty cycle and the second modulation duty cycle as the target modulation duty cycle. In other words, the vehicle-mounted power supply system can satisfy dynamic performance of the system as much as possible (that is, increase the output voltage of the power conversion circuit) when safety of the system is satisfied (that is, an output current of the power supply is less than a target current). The control circuit may be further configured to output a third power adjustment signal (for example, a modulation signal whose duty cycle is the target modulation duty cycle) based on the target modulation duty cycle, to adjust the output voltage of the power conversion circuit to the third target voltage. It may be understood that the proportional-integral circuit calculates the first modulation duty cycle and the second modulation duty cycle, the comparison circuit selects the smaller value as the target modulation duty cycle, and the control circuit outputs the third power adjustment signal based on the target modulation duty cycle, so that components in the system can be simplified, and applicability of the system can be improved.

With reference to a sixth possible implementation, the sampling circuit is further configured to collect a state parameter of the power supply. The voltage comparison control circuit is further configured to obtain the target current value based on the state parameter of the power supply. Herein, the state parameter of the power supply collected by the sampling circuit may include a parametric value indicating a state of the power supply, for example, the cell temperature of the power supply, a bus current of the power supply, and an output voltage of the power supply. The voltage comparison control circuit may correspondingly obtain a current target current value based on the state parameter of the power supply. It may be understood that the sampling circuit obtains the state parameter of the power supply in real time, and the voltage comparison control circuit obtains the target current value by using the state parameter of the power supply. This can improve flexibility and applicability of the system.

With reference to a seventh possible implementation, the control circuit is a pulse width modulation (PWM) circuit (or another circuit having a modulation function). The PWM circuit is connected to the proportional-integral circuit and the power conversion circuit. The PWM circuit may generate, based on the modulation duty cycle, a PWM signal as the power adjustment signal. The modulation duty cycle is the first modulation duty cycle, the second modulation duty cycle, or the target modulation duty cycle, and the power adjustment signal is the first power adjustment signal, the second power adjustment signal, or the third power adjustment signal. The power conversion circuit may further output the target voltage based on the PWM signal. The target voltage is the first target voltage, the second target voltage, or the third target voltage. It may be understood that the PWM circuit generates, based on the modulation duty cycle, the PWM signal whose duty cycle is the modulation duty cycle, and then uses the PWM signal as the power adjustment signal. A design is simple and convenient, components in the system are simplified, and applicability of the system is improved.

With reference to an eighth possible implementation, the power conversion circuit may be a direct current-direct current (DC-DC) circuit (or another circuit having a voltage conversion power supply function). The DC-DC circuit includes a first switching transistor, a second switching transistor, a third switching transistor, a fourth switching transistor, an inductor, and a capacitor. Herein, the first switching transistor and the second switching transistor are connected in series to form a first branch. The third switching transistor and the fourth switching transistor are connected in series to form a second branch. The inductor is connected to a series connection point of the first branch and a series connection point of the second branch. The capacitor is connected to the motor after being connected in parallel to the second branch. Herein, the DC-DC circuit may control, based on the PWM signal, turn-on and turn-off of the first switching transistor, the second switching transistor, the third switching transistor, and the fourth switching transistor to output the target voltage. It may be understood that the DC-DC circuit outputs the target voltage based on the PWM signal, so that control performance and stability of the vehicle-mounted power supply system can be improved, components in the system are simplified, and applicability of the system is improved.

With reference to a ninth possible implementation, the vehicle-mounted power supply system further includes a communication circuit. The communication circuit is connected to the voltage comparison control circuit. Herein, the communication circuit (which may be a communication interface, or another circuit or chip that can implement a communication function) may be configured to obtain the first target voltage value and transmit the first target voltage value to the voltage comparison control circuit. It may be understood that, corresponding to vehicles of different models or vehicles in different driving modes, the first target voltage value (namely, the rated input voltage of the motor) may also be different. Herein, the communication circuit obtains the first target voltage value, and transmits the obtained first target voltage value to the voltage comparison control circuit. This improves flexibility and applicability of the vehicle-mounted power supply system.

With reference to a tenth possible implementation, the vehicle-mounted power supply system further includes a mode switching circuit. A first connection terminal of the mode switching circuit is connected to the communication circuit, a second connection terminal of the mode switching circuit is connected to the power supply, and a third connection terminal of the mode switching circuit is connected to a load. Herein, the mode switching circuit (which may be a switch, a chip having a chip selection function, or another circuit or chip that can control conduction and cutoff of the circuit) may be configured to: when it is determined, by using the communication circuit, that the vehicle is in a standby mode, connect the power supply to the load, to supply power to the load by using the power supply. Herein, the load may be a general term of power-consuming components of the vehicle in the standby mode (namely, in a non-driving state), for example, a display, a vehicle light, and other components. It may be understood that the mode switching circuit may directly supply power to the load by using the power supply when the vehicle is in the standby mode, to reduce an energy loss caused by voltage conversion, and improve electric energy utilization.

DETAILED DESCRIPTION OF THE EMBODIMENTS

An electric vehicle may be a vehicle that uses a vehicle-mounted power supply as a power source, drives wheels by using a motor, and complies with various requirements of road transportation and safety regulations. The power supply may provide direct current energy for the motor of the electric vehicle. The motor of the electric vehicle may drive the motor to convert the direct current energy provided by the power supply into mechanical energy and drive the electric vehicle. Generally, the electric vehicle uses a battery (for example, a lithium battery, a lead-acid battery, or another battery) as the power source. However, during battery discharge, a voltage gradually decreases. When the voltage decreases, an acceleration and speed of the vehicle are affected. A vehicle-mounted power supply system can provide a proper input voltage for the motor of the vehicle under a battery level of the power supply, to ensure dynamic performance of the vehicle. The vehicle-mounted power supply system is applicable to an electric device driven by a motor. The electric device herein may include, but is not limited to, an electric vehicle, an electric recreation device, and another electric device. This may be determined based on an actual application scenario and is not limited herein.

Figure 1:
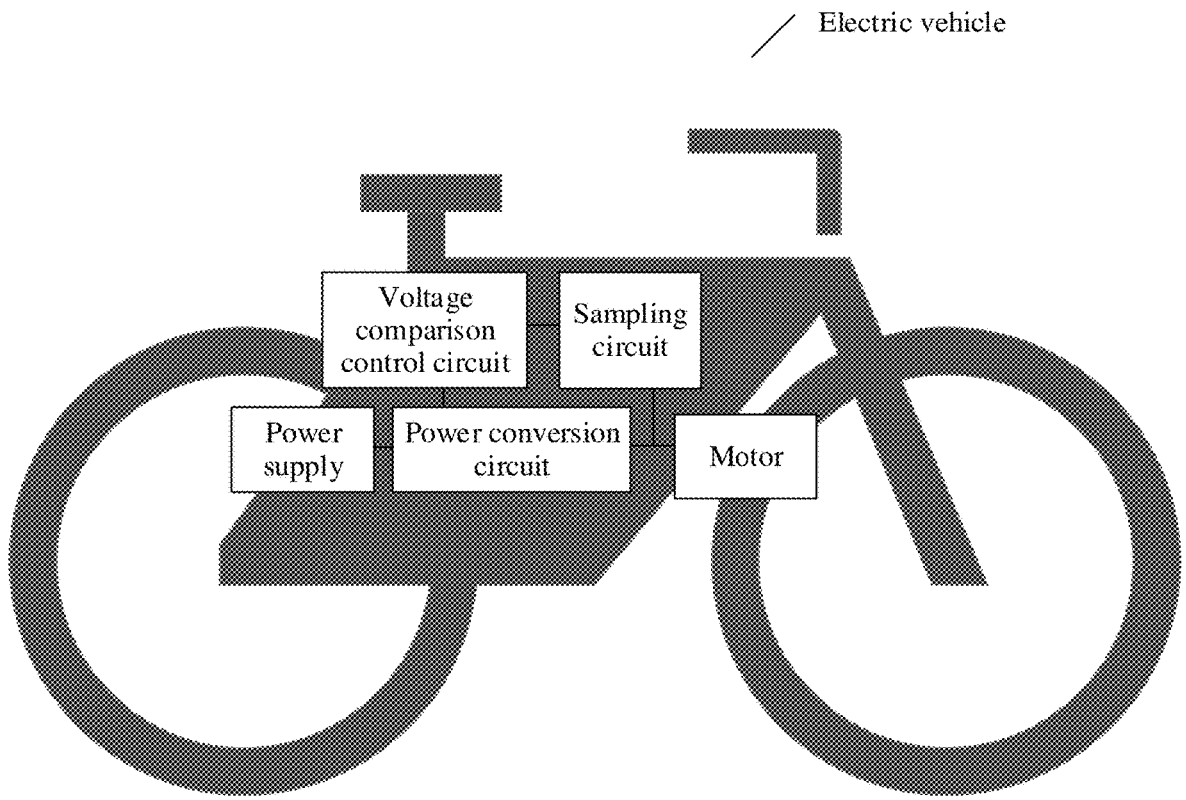
FIG. 1 is a schematic diagram of an application scenario of a vehicle-mounted power supply system.

The vehicle-mounted power supply system is applicable to different application scenarios, for example, electric vehicle and electric recreation device application scenarios. The electric vehicle application scenario is an example. FIG. 1 is a schematic diagram of an application scenario of a vehicle-mounted power supply system. The vehicle-mounted power supply system may include a sampling circuit, a voltage comparison control circuit, a power conversion circuit, and a motor. The sampling circuit is connected to an output terminal of the power conversion circuit and the voltage comparison control circuit. The voltage comparison control circuit is connected to the power conversion circuit. The power conversion circuit is connected to a power supply (for example, a power battery in an electric vehicle) and the motor (herein, the motor may include a motor controller and components such as a stator, a rotor, and a three-phase winding in the motor), so that the motor generates an electromagnetic torque positively correlated with an output voltage of the power conversion circuit (namely, the input voltage of the motor). In this way, the vehicle generates an acceleration that is positively correlated with the electromagnetic torque, to increase a driving speed of the vehicle. In the electric vehicle application scenario, as shown in FIG. 1, the electric vehicle includes the power supply and the vehicle-mounted power supply system (namely, the sampling circuit, the voltage comparison control circuit, the power conversion circuit, and the motor). The power supply may provide electric energy for the motor. In this case, the motor may convert, by using the motor, the electric energy provided by the power supply into mechanical energy, to drive the electric vehicle. However, during battery discharge, voltage gradually decreases. When the voltage decreases, the input voltage of the motor is affected, and the acceleration and speed of the vehicle are affected. The sampling circuit in the vehicle-mounted power supply system may obtain a voltage value of the output terminal of the power conversion circuit. When the output voltage is less than a first target voltage (namely, a rated input voltage of the motor), the voltage comparison control circuit may output a first power adjustment signal to the power conversion circuit. The power conversion circuit may increase the output voltage to the first target voltage based on the first power adjustment signal, and output the output voltage to the motor, to increase the input voltage of the motor. This ensures that the vehicle obtains a required acceleration and speed and is kept driving stably. In this case, the vehicle-mounted power supply system may increase the output voltage of the power conversion circuit, to increase the input voltage of the motor. This ensures that the vehicle obtains the required acceleration and speed and improves user experience. In addition, the sampling circuit obtains an output voltage value in real time. This improves flexibility of the system. The voltage comparison control circuit and the power conversion circuit control the output voltage. A circuit is simple, and applicability of the system can be improved. It may be understood that increasing the output voltage to the first target voltage is merely a possible implementation. When the power supply of the vehicle does not match a voltage required by the motor (for example, a voltage of the power supply is higher than the rated input voltage of the motor), the vehicle-mounted power supply system may also decrease the output voltage (for example, decrease the output voltage to the rated input voltage of the motor). This may be set based on an application scenario, and details are not described herein again. The following describes an example of a vehicle-mounted power supply system with reference to FIG. 2 to FIG. 9.

Figure 2:
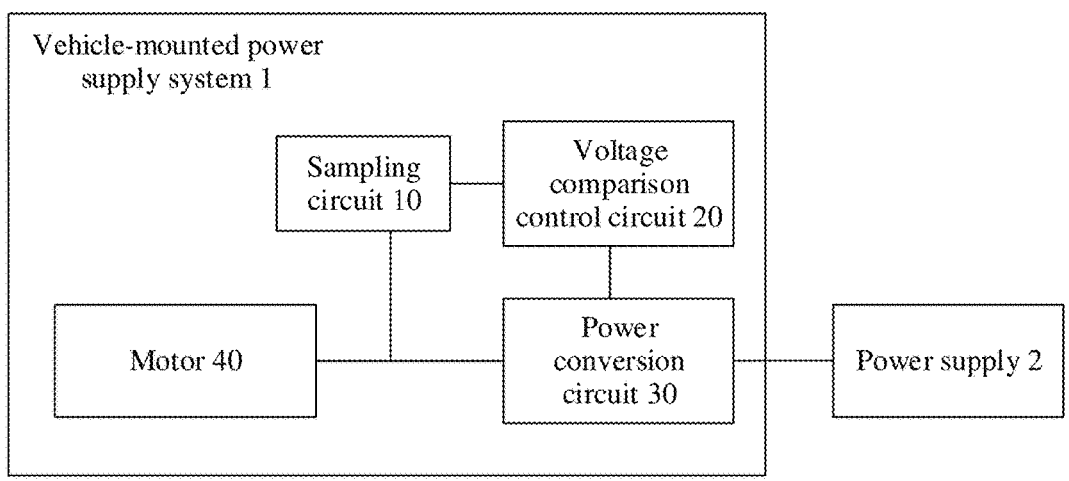
FIG. 2 is a schematic diagram of a structure of a vehicle-mounted power supply system.

FIG. 2 is a schematic diagram of a structure of a vehicle-mounted power supply system. As shown in FIG. 2, the vehicle-mounted power supply system includes a sampling circuit 10, a voltage comparison control circuit 20, a power conversion circuit 30, and a motor 40. The sampling circuit 10 is connected to an output terminal of the power conversion circuit 30 and the voltage comparison control circuit 20. The voltage comparison control circuit 20 is connected to the power conversion circuit 30. The power conversion circuit 30 is connected to a power supply 2 and the motor 40.

In some feasible implementations, the sampling circuit 10 may be configured to obtain an output voltage value of the output terminal of the power conversion circuit 30. Herein, an output voltage of the power conversion circuit 30 acts on the motor 40 (herein, the motor 40 may include a motor controller and components such as a stator, a rotor, and a three-phase winding in the motor), so that the motor generates an electromagnetic torque positively correlated with the output voltage of the power conversion circuit 30. In this way, a vehicle generates an acceleration that is positively correlated with the electromagnetic torque, to increase a driving speed of the vehicle. The voltage comparison control circuit 20 may be configured to output a first power adjustment signal to the power conversion circuit 30 when the output voltage value is less than a first target voltage value. Herein, the power conversion circuit 30 may increase the output voltage to a first target voltage based on the first power adjustment signal, to maintain an input voltage of the motor 40 at a required level when the voltage of the power supply 2 is low. This ensures that the vehicle obtains a required acceleration and speed.

In an implementation, the sampling circuit 10 may obtain the output voltage value of the output terminal of the power conversion circuit 30. The voltage comparison control circuit 20 may output the first power adjustment signal to the power conversion circuit 30 based on the output voltage value and the first target voltage value. The power conversion circuit 30 may increase the output voltage to the first target voltage based on the first power adjustment signal, to drive the motor 40 by using the output voltage, so that a torque of the motor 40 reaches a first target torque and/or a rotational speed of the motor 40 reaches a first target rotational speed. When the voltage of the power supply 2 in the vehicle is low, the vehicle-mounted power supply system may increase the output voltage, so that the vehicle still maintains a high driving speed and acceleration. This improves user experience. In addition, the sampling circuit 10 obtains the output voltage value in real time. This improves flexibility of the system. The voltage comparison control circuit 20 and the power conversion circuit 30 control the output voltage. A circuit is simple, and applicability of the system is improved.

Figure 3:
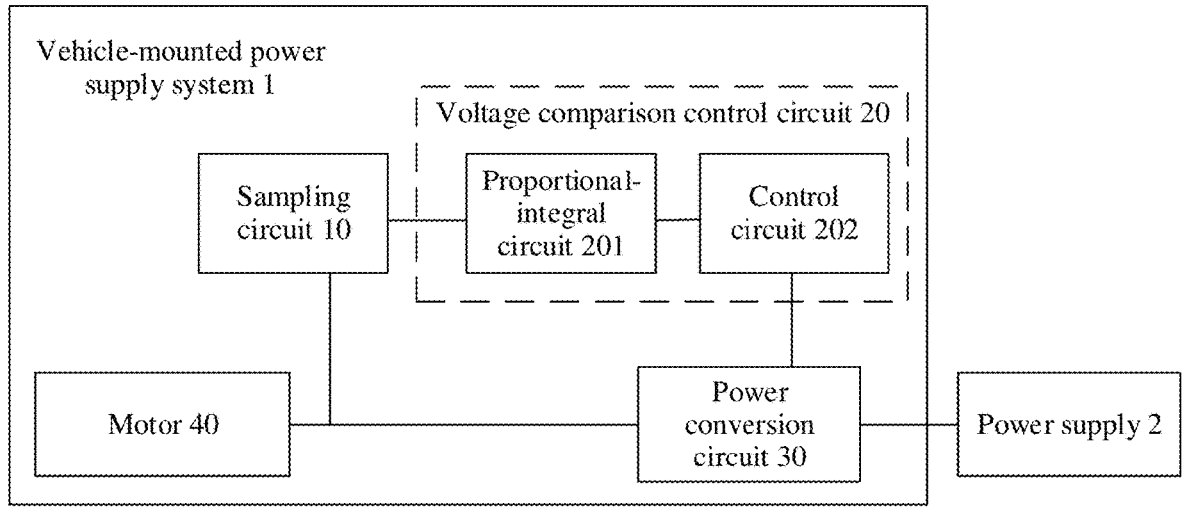
FIG. 3 is a schematic diagram of another structure of a vehicle-mounted power supply system.

In some feasible implementations, the voltage comparison control circuit 20 may include a proportional-integral circuit 201 and a control circuit 202. FIG. 3 is a schematic diagram of another structure of a vehicle-mounted power supply system. Connection manners of the sampling circuit 10, the power conversion circuit 30, and the motor 40 in FIG. 3 are the same as those of the sampling circuit 10, the power conversion circuit 30, and the motor 40 in FIG. 2. In addition, the sampling circuit 10, the power conversion circuit 30, and the motor 40 in FIG. 3 may implement functions of the sampling circuit 10, the power conversion circuit 30, and the motor 40 shown in FIG. 2. Details are not described herein again. As shown in FIG. 3, the proportional-integral circuit 201 (or a proportional integrator) of the voltage comparison control circuit 20 is connected to the sampling circuit 10 and the control circuit 202 of the voltage comparison control circuit 20, and the control circuit 202 is connected to the power conversion circuit 30. The proportional-integral circuit 201 may obtain a first modulation duty cycle based on the output voltage value and the first target voltage value. The control circuit 202 is configured to output the first power adjustment signal based on the first modulation duty cycle when the output voltage value is less than the first target voltage value. It may be understood that the proportional-integral circuit 201 may obtain, by comparing the output voltage value with the first target voltage value, the first modulation duty cycle required for modulating the output voltage value to the first target voltage value. Herein, the first modulation duty cycle may be obtained through calculation based on a difference between the output voltage value and the first target voltage value or may be obtained through calculation based on a ratio of the output voltage value to the first target voltage value or may be obtained through calculation by using another circuit having a function similar to that of the proportional-integral circuit 201. The control circuit 202 may output the first power adjustment signal (for example, a modulation signal whose duty cycle is the first modulation duty cycle) based on the first modulation duty cycle. Herein, the proportional-integral circuit 201 and the control circuit 202 may alternatively be integrated into a proportional-integral controller (for example, a PI controller or another controller). The proportional-integral controller (for example, the PI controller) may form a control deviation based on a given value (namely, the first target voltage value) and an actual output value (namely, the output voltage value), form a control value by performing linear combination on a proportion and an integral of the deviation, and control a controlled object (namely, the modulation duty cycle of the power adjustment signal), to obtain the first power adjustment signal. It may be understood that the vehicle-mounted power supply system calculates the first modulation duty cycle by using the proportional-integral circuit 201, and outputs the first power adjustment signal based on the first modulation duty cycle by using the control circuit 202, so that components in the system can be simplified, and applicability of the system can be improved.

Figure 4:
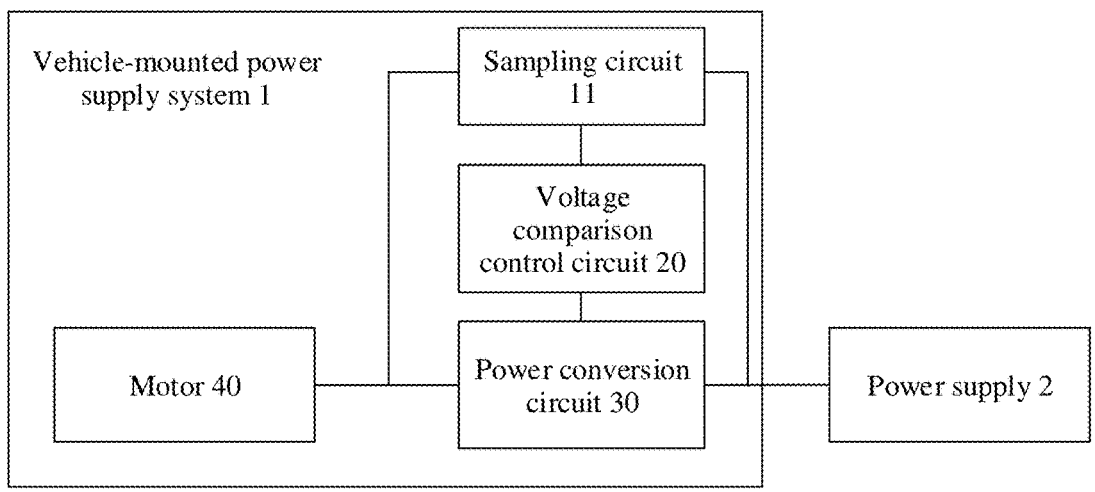
FIG. 4 is a schematic diagram of another structure of a vehicle-mounted power supply system.

In some feasible implementations, the sampling circuit may be further connected to the power supply and obtain an output current value of the power supply 2, so that the vehicle-mounted power supply system can control the output voltage of the power conversion circuit 30 based on the output current. FIG. 4 is a schematic diagram of another structure of a vehicle-mounted power supply system. Connection manners of the voltage comparison control circuit 20, the power conversion circuit 30, and the motor 40 in FIG. 4 are the same as those of the voltage comparison control circuit 20, the power conversion circuit 30, and the motor 40 in FIG. 2. Details are not described herein again. As shown in FIG. 4, a sampling circuit 11 may be further configured to connect to the power supply 2 and obtain the output current value of the power supply 2. Herein, the output current value of the power supply 2 is positively correlated with a torque of the motor 40, and a maximum value of the output current value of the power supply 2 is positively correlated with the output voltage value of the power conversion circuit 30 (in other words, the output current value is limited by the output voltage value of the power conversion circuit). When the torque of the motor 40 (corresponding to the acceleration of the vehicle) increases, the output current value of the power supply 2 accordingly increases. To ensure safety of the system, the output current value of the power supply 2 is usually limited not to exceed a target current value. Herein, the target current value may be a value set by the system in an initial state or may be correspondingly obtained in real time based on parameters (for example, a cell temperature of the power supply 2) of some components in the system. Herein, the voltage comparison control circuit 20 may output a second power adjustment signal to the power conversion circuit 30 when the output current value of the power supply 2 is greater than the target current value, so that the power conversion circuit 30 can decrease the output voltage to a second target voltage based on the second power adjustment signal, and the output current value of the power supply 2 is less than or equal to the target current value.

In an implementation, the sampling circuit 11 may obtain the output current value of the power supply 2. The voltage comparison control circuit 20 may output the second power adjustment signal to the power conversion circuit 30 when the output current value of the power supply 2 is greater than the target current value. The power conversion circuit 30 may decrease the output voltage to the second target voltage based on the second power adjustment signal, to reduce the output current value of the power supply 2, so that the output current value of the power supply 2 is less than or equal to the target current value. When the driving speed of the vehicle meets requirements, the vehicle-mounted power supply system can decrease the output voltage to ensure that an output current of the power supply 2 is still kept in a safe range in a driving process of the vehicle. This improves safety of the system. In addition, the sampling circuit 11 obtains the output current value of the power supply 2 in real time. This improves flexibility of the system. The voltage comparison control circuit 20 and the power conversion circuit 30 control the output voltage. A circuit is simple, and applicability of the system is improved.

Figure 5:
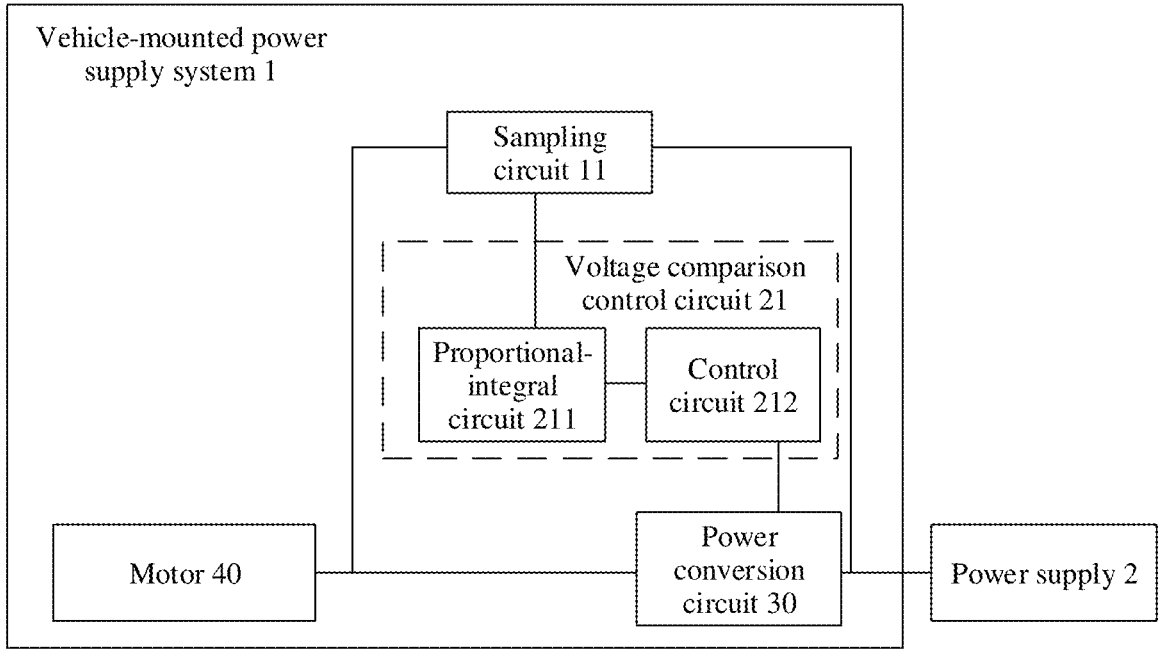
FIG. 5 is a schematic diagram of another structure of a vehicle-mounted power supply system.

In some feasible implementations, a voltage comparison control circuit 21 may include a proportional-integral circuit 211 and a control circuit 212. FIG. 5 is a schematic diagram of another structure of a vehicle-mounted power supply system. Connection manners of the sampling circuit 11, the power conversion circuit 30, and the motor 40 in FIG. 5 are the same as those of the sampling circuit 11, the power conversion circuit 30, and the motor 40 in FIG. 4. In addition, the sampling circuit 11, the power conversion circuit 30, and the motor 40 in FIG. 5 may implement functions of the sampling circuit 11, the power conversion circuit 30, and the motor 40 in FIG. 4. Details are not described herein again. As shown in FIG. 5, the proportional-integral circuit 211 (or a proportional integrator) of the voltage comparison control circuit 21 is connected to the sampling circuit 11 and the control circuit 212 of the voltage comparison control circuit 21, and the control circuit 212 is connected to the power conversion circuit 30.

It may be understood that when the output current value of the power supply 2 is greater than the target current value, the proportional-integral circuit 211 (or the proportional integrator) may obtain a second modulation duty cycle based on the output current value of the power supply 2 and a second target voltage value. The control circuit 212 may further output a second power adjustment signal based on the second modulation duty cycle, to decrease the output voltage of the power conversion circuit 30 to the second target voltage. It may be understood that the proportional-integral circuit 211 may obtain, by comparing the output current value of the power supply 2 with the target current value, the second modulation duty cycle required for modulating the output voltage value to the second target voltage value (namely, the second modulation duty cycle for modulating the output current value of the power supply 2 to the target current value). Herein, the second modulation duty cycle may be obtained through calculation based on a difference between the output current value of the power supply 2 and the target current value, or may be obtained through calculation based on a ratio of the output current value of the power supply 2 to the target current value, or may be obtained through calculation by using another circuit having a function similar to that of the proportional-integral circuit 211. The control circuit 212 may output the second power adjustment signal (for example, a modulation signal whose duty cycle is the second modulation duty cycle) based on the second modulation duty cycle. Herein, the proportional-integral circuit 211 and the control circuit 212 may alternatively be integrated into a proportional-integral controller (for example, a PI controller or another controller). The proportional-integral controller (for example, the PI controller) may form a control deviation based on a given value (namely, the target current value) and an actual output value (namely, the output current value of the power supply 2), form a control value by performing linear combination on a proportion and an integral of the deviation, and control a controlled object (namely, the modulation duty cycle of the power adjustment signal), to obtain the second power adjustment signal. It may be understood that the proportional-integral circuit 211 calculates the second modulation duty cycle, and the control circuit 212 outputs the second power adjustment signal based on the second modulation duty cycle, so that components in the system can be simplified, and applicability of the system can be improved.

In some feasible implementations, the sampling circuit 11 may be further configured to connect to the power supply 2 and obtain the output current value of the power supply 2. The voltage comparison control circuit 21 may be further configured to output a third power adjustment signal when the output voltage value is less than the first target voltage value and the output current value of the power supply 2 is less than the target current value. In this case, because the output current value of the power supply 2 is less than the target current value, it means that when safety is satisfied, the system may increase the output voltage of the power conversion circuit 30 to a third target voltage, to increase the input voltage of the motor 40. Herein, the third target voltage is less than or equal to the first target voltage. It may be understood that the power conversion circuit 30 may further increase the output voltage to the third target voltage based on the third power adjustment signal, to increase the input voltage of the motor 40 when safety is satisfied, so as to meet a driving requirement of the vehicle and improve dynamic performance of the vehicle.

In an implementation, the sampling circuit 11 may obtain the output current value of the power supply 2. The voltage comparison control circuit 21 may output the third power adjustment signal to the power conversion circuit 30 when the output voltage is less than the first target voltage and the output current value of the power supply 2 is less than the target current value. The power conversion circuit 30 may increase the output voltage to the third target voltage based on the third power adjustment signal. In other words, when system safety is ensured, the system can increase the output voltage of the power conversion circuit 30, to increase the driving speed of the vehicle. In addition, the sampling circuit 11 obtains the output current value of the power supply 2 and the output voltage value of the power conversion circuit 30 in real time. This improves flexibility and safety of the system. The voltage comparison control circuit 21 and the power conversion circuit 30 control the output voltage. A circuit is simple, and applicability of the system is improved.

Figure 6:
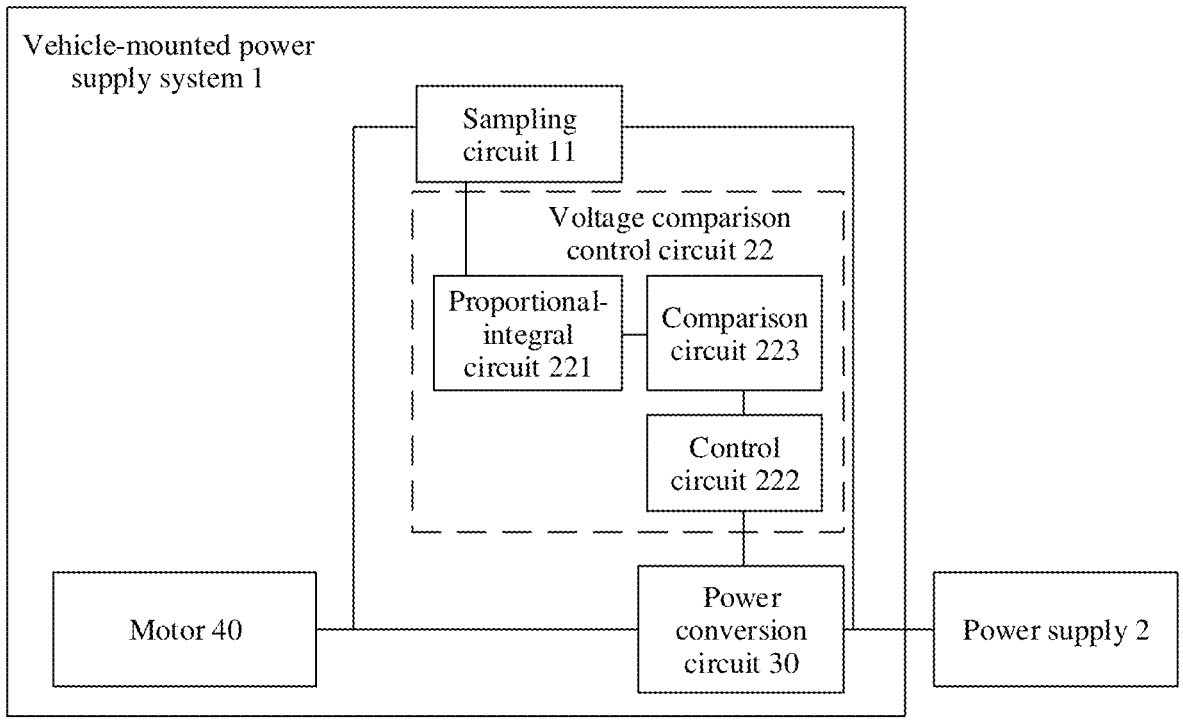
FIG. 6 is a schematic diagram of another structure of a vehicle-mounted power supply system.

In some feasible implementations, a voltage comparison control circuit 22 may include a proportional-integral circuit 221, a control circuit 222, and a comparison circuit 223. FIG. 6 is a schematic diagram of another structure of a vehicle-mounted power supply system. Connection manners of the sampling circuit 11, the power conversion circuit 30, and the motor 40 in FIG. 6 are the same as those of the sampling circuit 11, the power conversion circuit 30, and the motor 40 in FIG. 4 and FIG. 5. In addition, the sampling circuit 11, the power conversion circuit 30, and the motor 40 in FIG. 6 may implement functions of the sampling circuit 11, the power conversion circuit 30, and the motor 40 in FIG. 4 and FIG. 5. Details are not described herein again. As shown in FIG. 6, the voltage comparison control circuit 22 may include the proportional-integral circuit 221, the control circuit 222, and the comparison circuit 223. The proportional-integral circuit 221 of the voltage comparison control circuit 22 is connected to the sampling circuit 11 and the comparison circuit 223 of the voltage comparison control circuit 22. The comparison circuit 223 is connected to the control circuit 222 of the voltage comparison control circuit 22. The control circuit 222 is connected to the power conversion circuit 30. The proportional-integral circuit 221 (or the proportional integrator) may obtain a first modulation duty cycle based on the output voltage value and the first target voltage value and obtain a second modulation duty cycle based on the output current value of the power supply 2 and the target current value. It may be understood that the first modulation duty cycle required for modulating the output voltage value to the first target voltage value may be obtained by comparing the output voltage value with the first target voltage value, or the second modulation duty cycle required for modulating the output voltage value to a second target voltage value (namely, the second modulation duty cycle for modulating the output current value of the power supply 2 to the target current value) may be obtained by comparing the output current value of the power supply 2 with the target current value. Herein, the first modulation duty cycle may be obtained through calculation based on a difference between the output voltage value and the first target voltage value or may be obtained through calculation based on a ratio of the output voltage value to the first target voltage value or may be obtained through calculation by using another circuit having a function similar to that of the proportional-integral circuit 221. Herein, the second modulation duty cycle may be obtained through calculation based on a difference between the output current value of the power supply 2 and the target current value, or may be obtained through calculation based on a ratio of the output current value of the power supply 2 to the target current value, or may be obtained through calculation by using another circuit having a function similar to that of the proportional-integral circuit 221. The comparison circuit 223 may obtain a target modulation duty cycle based on the first modulation duty cycle and the second modulation duty cycle that are output by the proportional-integral circuit 221. Herein, the target modulation duty cycle is a smaller value of the first modulation duty cycle and the second modulation duty cycle. In other words, the comparison circuit 223 may use the smaller value of the first modulation duty cycle and the second modulation duty cycle as the target modulation duty cycle. In other words, the vehicle-mounted power supply system can satisfy dynamic performance of the system as much as possible (that is, increase the output voltage of the power conversion circuit 30) when safety of the system is satisfied (that is, an output current of the power supply 2 is less than a target current). The control circuit 222 may be further configured to output a third power adjustment signal (for example, a modulation signal whose duty cycle is the target modulation duty cycle) based on the target modulation duty cycle, to adjust the output voltage of the power conversion circuit 30 to the third target voltage. It may be understood that the proportional-integral circuit 221 calculates the first modulation duty cycle and the second modulation duty cycle, the comparison circuit 223 selects the smaller value as the target modulation duty cycle, and the control circuit 222 outputs the third power adjustment signal based on the target modulation duty cycle, so that components in the system can be simplified, and applicability of the system can be improved.

In some feasible implementations, the sampling circuit 11 is configured to collect a state parameter of the power supply 2, and the voltage comparison control circuit 22 may obtain the target current value based on the state parameter of the power supply 2. Herein, the state parameter of the power supply 2 collected by the sampling circuit 11 may include a parametric value indicating a state of the power supply 2, for example, the cell temperature of the power supply 2, a bus current of the power supply 2, and an output voltage of the power supply 2. The voltage comparison control circuit 22 may correspondingly obtain a current target current value based on the state parameter of the power supply 2. It may be understood that the sampling circuit 11 obtains the state parameter of the power supply 2 in real time, and the voltage comparison control circuit 22 obtains the target current value by using the state parameter of the power supply 2. This can improve flexibility and applicability of the system.

Figure 7:
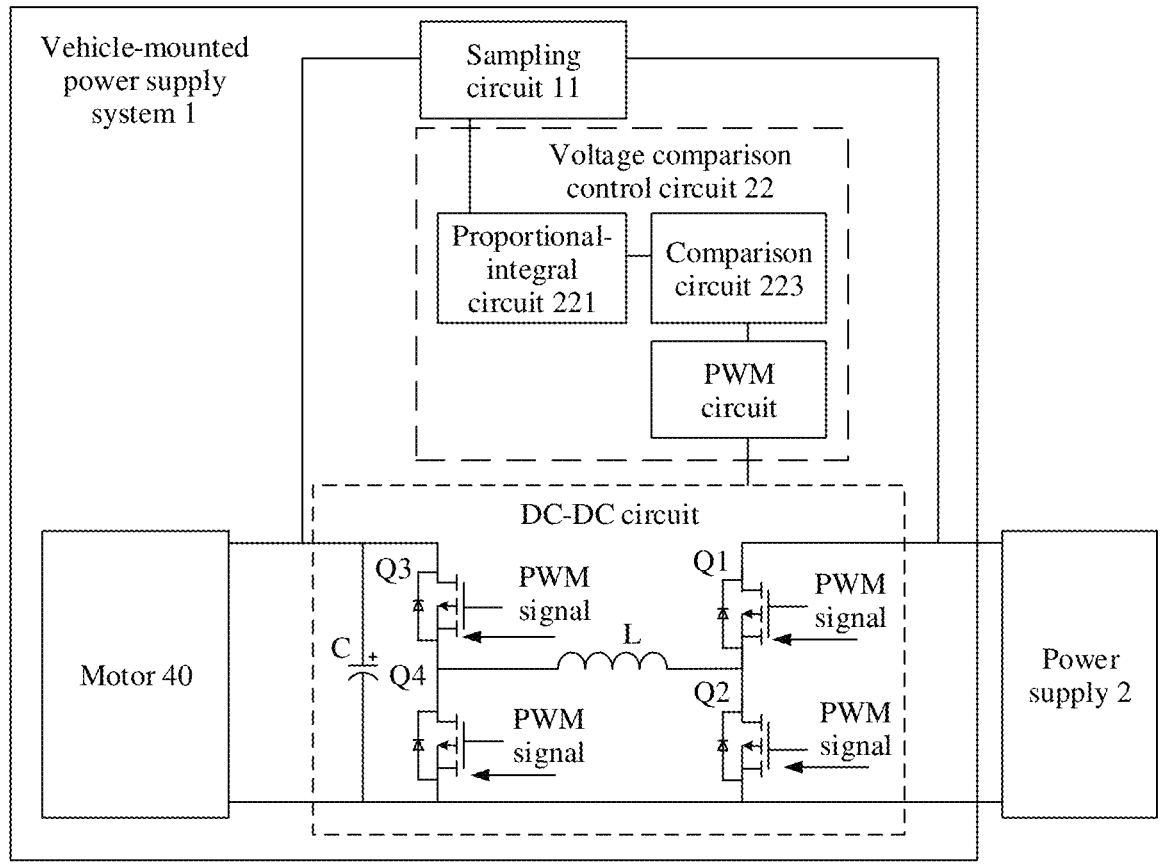
FIG. 7 is a schematic diagram of another structure of a vehicle-mounted power supply system.

In some feasible implementations, the control circuit 222 may function as a PWM circuit (or another circuit having a modulation function). FIG. 7 is a schematic diagram of another structure of a vehicle-mounted power supply system. Connection manners of the sampling circuit 11, the proportional-integral circuit 221, the comparison circuit 223, and the motor 40 in FIG. 7 are the same as those of the sampling circuit 11, the proportional-integral circuit 221, the comparison circuit 223, and the motor 40 in FIG. 6. In addition, the sampling circuit 11, the proportional-integral circuit 221, the comparison circuit 223, and the motor 40 in FIG. 7 may implement functions of the sampling circuit 11, the proportional-integral circuit 221, the comparison circuit 223, and the motor 40 in FIG. 6. Details are not described herein again. As shown in FIG. 7, the PWM circuit is connected to the proportional-integral circuit 221 and the power conversion circuit 30 (namely, a DC-DC circuit in FIG. 7). The PWM circuit may generate, based on the modulation duty cycle, a PWM signal as the power adjustment signal. The modulation duty cycle is the first modulation duty cycle, the second modulation duty cycle, or the target modulation duty cycle, and the power adjustment signal is the first power adjustment signal, the second power adjustment signal, or the third power adjustment signal. The power conversion circuit 30 is further configured to output the target voltage based on the PWM signal. The target voltage is the first target voltage, the second target voltage, or the third target voltage. It may be understood that the PWM circuit generates, based on the modulation duty cycle, the PWM signal whose duty cycle is the modulation duty cycle, and then uses the PWM signal as the power adjustment signal. A design is simple and convenient, components in the system are simplified, and applicability of the system is improved.

In some feasible implementations, further refer to FIG. 7. As shown in FIG. 7, the power conversion circuit 30 may function as the DC-DC circuit (or another circuit having a voltage conversion power supply function). Herein, the DC-DC circuit includes a first switching transistor, a second switching transistor, a third switching transistor, a fourth switching transistor, an inductor, and a capacitor. Herein, the first switching transistor and the second switching transistor are connected in series to form a first branch. The third switching transistor and the fourth switching transistor are connected in series to form a second branch. The inductor is connected to a series connection point of the first branch and a series connection point of the second branch. The capacitor is connected to the motor 40 after being connected in parallel to the second branch. Herein, the DC-DC circuit may control, based on the PWM signal, turn-on and turn-off of the first switching transistor, the second switching transistor, the third switching transistor, and the fourth switching transistor to output the target voltage. It may be understood that the DC-DC circuit outputs the target voltage based on the PWM signal, so that control performance and stability of the vehicle-mounted power supply system can be improved, components in the system are simplified, and applicability of the system is improved.

It may be understood that the control circuit 222 functioning as the PWM circuit and the power conversion circuit 30 functioning as the DC-DC circuit are merely a possible implementation. The control circuit 222 and the power conversion circuit 30 may alternatively be another circuit (or chip) that has a function of generating an adjustment signal and another circuit (or chip) that can change a voltage based on the adjustment signal and may be set based on an application scenario. Details are not described herein again.

Figure 8:
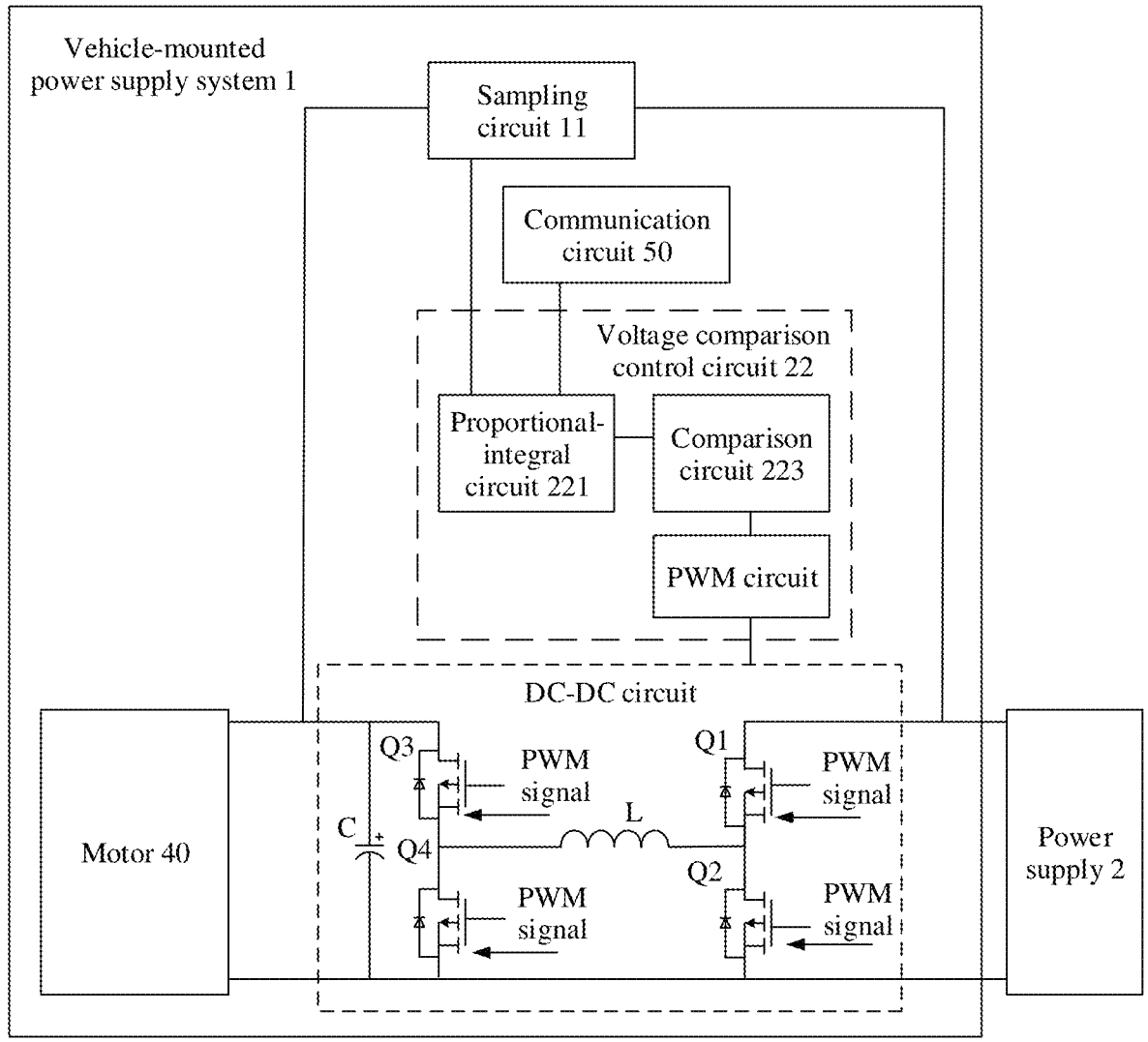
FIG. 8 is a schematic diagram of another structure of a vehicle-mounted power supply system.

In some feasible implementations, the vehicle-mounted power supply system further includes a communication circuit 50. FIG. 8 is a schematic diagram of another structure of a vehicle-mounted power supply system. Connection manners of the sampling circuit 11, the voltage comparison control circuit 22, the DC-DC circuit (the power conversion circuit 30), and the motor 40 in FIG. 8 are the same as those of the sampling circuit 11, the voltage comparison control circuit 22, the DC-DC circuit (the power conversion circuit 30), and the motor 40 in FIG. 7. In addition, the sampling circuit 11, the voltage comparison control circuit 22, the DC-DC circuit (the power conversion circuit 30), and the motor 40 in FIG. 8 may implement functions of the sampling circuit 11, the voltage comparison control circuit 22, the DC-DC circuit (the power conversion circuit 30), and the motor 40 in FIG. 7. Details are not described herein again. As shown in FIG. 8, the communication circuit 50 is connected to the voltage comparison control circuit 22. Herein, the communication circuit 50 (which may be a communication interface, or another circuit or chip that can implement a communication function) may be configured to obtain the first target voltage value and transmit the first target voltage value to the voltage comparison control circuit 22. It may be understood that, corresponding to vehicles of different models or vehicles of different driving modes, the first target voltage value (namely, the rated input voltage of the motor 40) may also be different. Herein, the communication circuit 50 obtains the first target voltage value and transmits the obtained first target voltage value to the voltage comparison control circuit 22. This improves flexibility and applicability of the vehicle-mounted power supply system.

Figure 9:
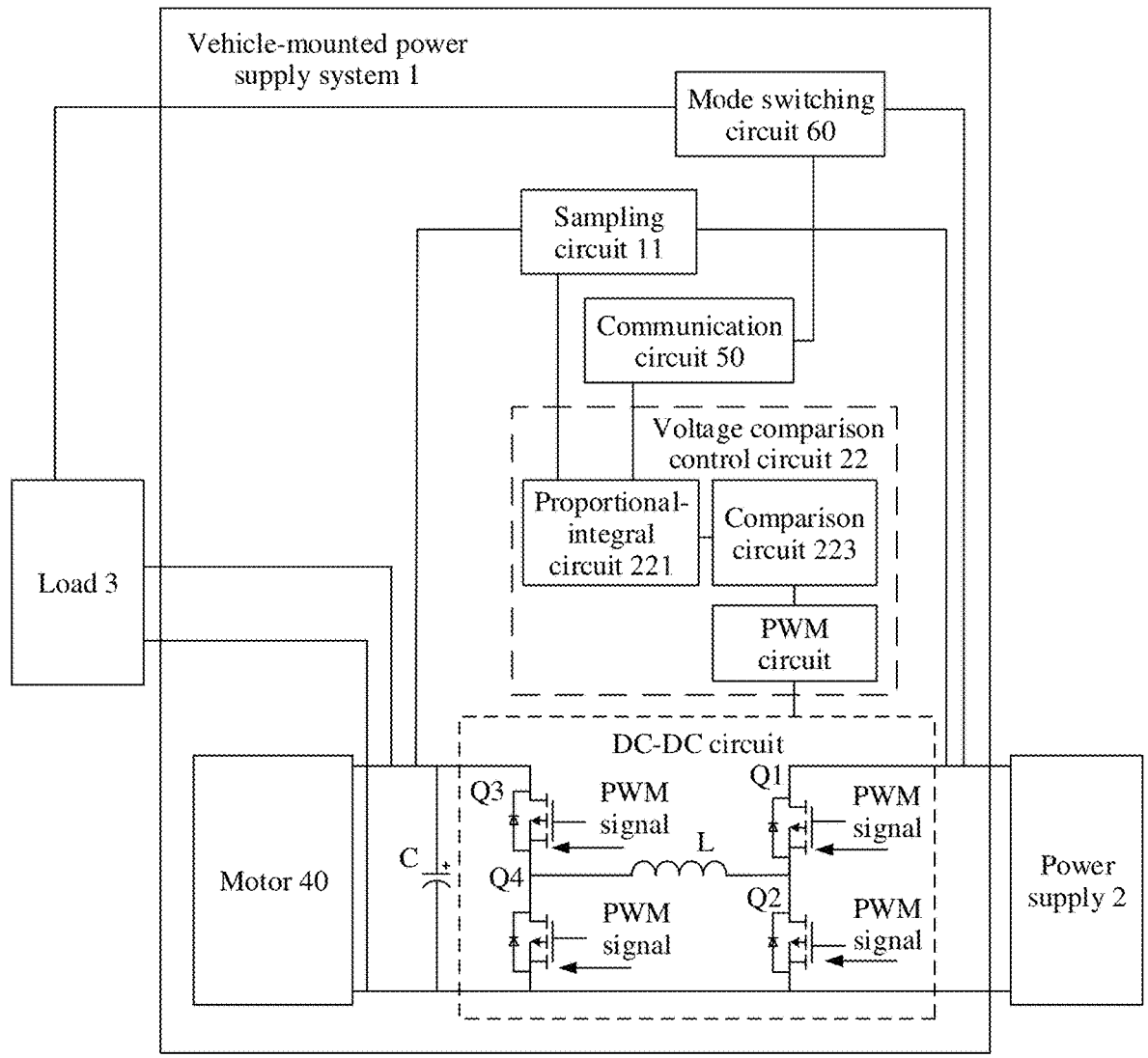
FIG. 9 is a schematic diagram of another structure of a vehicle-mounted power supply system.

In some feasible implementations, the vehicle-mounted power supply system further includes a mode switching circuit 60. FIG. 9 is a schematic diagram of another structure of a vehicle-mounted power supply system. Connection manners of the sampling circuit 11, the voltage comparison control circuit 22, the DC-DC circuit (the power conversion circuit 30), the motor 40, and the communication circuit 50 in FIG. 9 are the same as those of the sampling circuit 11, the voltage comparison control circuit 22, the DC-DC circuit (the power conversion circuit 30), the motor 40, and the communication circuit 50 in FIG. 8. In addition, the sampling circuit 11, the voltage comparison control circuit 22, the DC-DC circuit (the power conversion circuit 30), the motor 40, and the communication circuit 50 in FIG. 9 may implement functions of the sampling circuit 11, the voltage comparison control circuit 22, the DC-DC circuit (the power conversion circuit 30), the motor 40, and the communication circuit 50 in FIG. 8. Details are not described herein again. As shown in FIG. 9, a first connection terminal of the mode switching circuit 60 is connected to the communication circuit 50, a second connection terminal of the mode switching circuit 60 is connected to the power supply 2, and a third connection terminal of the mode switching circuit 60 is connected to a load 3. Herein, the mode switching circuit 60 (which may be a switch, a chip having a chip selection function, or another circuit or chip that can control conduction and cutoff of the circuit) may be configured to: when it is determined, by using the communication circuit 50, that the vehicle is in a standby mode, connect the power supply 2 to the load 3, to supply power to the load 3 by using the power supply 2. Herein, the load 3 may be a general term of power-consuming components of the vehicle in the standby mode (namely, in a non-driving state), for example, a display, a vehicle light, and other components. It may be understood that the mode switching circuit 60 may directly supply power to the load 3 by using the power supply 2 when the vehicle is in the standby mode, to reduce an energy loss caused by voltage conversion, and improve electric energy utilization.

The foregoing descriptions are merely implementations but are not intended as limiting.

What is claimed is:

1. A vehicle-mounted power supply system, comprising:
a sampling circuit;
a voltage comparison control circuit;
a power conversion circuit; and
a motor, wherein the sampling circuit is configured to obtain an output voltage value of an output terminal of the power conversion circuit, the voltage comparison control circuit is configured to output a first power adjustment signal to the power conversion circuit when the output voltage value is less than a first target voltage value, the power conversion circuit is configured to increase an output voltage to a first target voltage based on the first power adjustment signal, to output the output voltage to the motor, and the sampling circuit is further configured to connect to a power supply and obtain an output current value of the power supply.

2. The vehicle-mounted power supply system according to claim 1, wherein the voltage comparison control circuit further comprises:
a proportional-integral circuit configured to obtain a first modulation duty cycle based on the output voltage value and the first target voltage value and
a control circuit configured to output the first power adjustment signal based on the first modulation duty cycle when the output voltage value is less than the first target voltage value.

3. The vehicle-mounted power supply system according to claim 2, wherein the voltage comparison control circuit is further configured to output a second power adjustment signal when the output current value of the power supply is greater than a target current value, the power conversion circuit is further configured to decrease the output voltage to a second target voltage based on the second power adjustment signal, and, when the output voltage is the second target voltage, the output current value of the power supply is less than or equal to the target current value.

4. The vehicle-mounted power supply system according to claim 1, wherein the voltage comparison control circuit is further configured to output a second power adjustment signal when the output current value of the power supply is greater than a target current value, the power conversion circuit is further configured to decrease the output voltage to a second target voltage based on the second power adjustment signal, and, when the output voltage is the second target voltage, the output current value of the power supply is less than or equal to the target current value.

5. The vehicle-mounted power supply system according to claim 4, wherein the proportional-integral circuit is further configured to obtain a second modulation duty cycle based on the output current value of the power supply and the target current value when the output current value of the power supply is greater than the target current value and the control circuit is further configured to output the second power adjustment signal based on the second modulation duty cycle.

6. The vehicle-mounted power supply system according to claim 1, wherein the voltage comparison control circuit is further configured to output a third power adjustment signal when the output voltage value is less than the first target voltage value and the output current value of the power supply is less than a target current value, and the power conversion circuit is further configured to increase the output voltage to a third target voltage based on the third power adjustment signal, and, when the output voltage is the third target voltage, the output current value of the power supply is less than or equal to the target current value.

7. The vehicle-mounted power supply system according to claim 6, wherein the voltage comparison control circuit further comprises:
a proportional-integral circuit configured to obtain a first modulation duty cycle based on the output voltage value and the first target voltage value and obtain a second modulation duty cycle based on the output current value of the power supply and the target current value;
a control circuit, and
a comparison circuit configured to obtain a target modulation duty cycle based on the first modulation duty cycle and the second modulation duty cycle, wherein the target modulation duty cycle is a smaller value of the first modulation duty cycle and the second modulation duty cycle and output the third power adjustment signal to the power conversion circuit based on the target modulation duty cycle.

8. The vehicle-mounted power supply system according to claim 1, wherein the sampling circuit is further configured to collect a state parameter of the power supply and the voltage comparison control circuit is further configured to obtain the target current value based on the state parameter of the power supply.

9. The vehicle-mounted power supply system according to claim 1, wherein the control circuit is a pulse width modulation (PWM) circuit configured to generate, based on the modulation duty cycle, a PWM signal as the power adjustment signal, the modulation duty cycle is the first modulation duty cycle, the second modulation duty cycle, or the target modulation duty cycle, the power adjustment signal is the first power adjustment signal, the second power adjustment signal, or the third power adjustment signal, the power conversion circuit is further configured to output the target voltage based on the PWM signal, and the target voltage is the first target voltage, the second target voltage, or the third target voltage.

10. The vehicle-mounted power supply system according to claim 9, wherein the power conversion circuit is a direct current-direct current (DC-DC) circuit comprising a first switching transistor, a second switching transistor, a third switching transistor, a fourth switching transistor, an inductor, and a capacitor, the first switching transistor and the second switching transistor are connected in series to form a first branch, the third switching transistor and the fourth switching transistor are connected in series to form a second branch, the inductor is connected to a series connection point of the first branch and a series connection point of the second branch, and the capacitor is connected to the motor after being connected in parallel to the second branch, and the DC-DC circuit is configured to control, based on the PWM signal, turn-on and turn-off of the first switching transistor, the second switching transistor, the third switching transistor, and the fourth switching transistor to output the target voltage.

11. The vehicle-mounted power supply system according to claim 1, further comprising:
a communication circuit connected to the voltage comparison control circuit that is configured to obtain the first target voltage value and transmit the first target voltage value to the voltage comparison control circuit.

12. The vehicle-mounted power supply system according to claim 11, further comprising:
a mode switching circuit configured to, when a vehicle is in a standby mode, connect the power supply to a load, to supply power to the load by using the power supply.

* * * * *